United States Patent [19]

Gold

[11] Patent Number: 5,893,622

[45] Date of Patent: Apr. 13, 1999

[54] OPTICAL APERTURE WITH PREDETERMINED ATTENUATION PATTERNS HAVING POLARIZERS THAT ARE BLACK GUEST HOST LIQUID CRYSTAL OR MULTILAYER, THINFILM, POLARIZING, BEAMSPLITTING PRISM

[75] Inventor: Ronald S. Gold, Fullerton, Calif.

[73] Assignee: Raytheon Company, El Segundo, Calif.

[21] Appl. No.: 08/636,199

[22] Filed: Apr. 22, 1996

[51] Int. Cl.$^6$ .................. G02F 1/1335; G02F 1/1347; G02F 1/1343

[52] U.S. Cl. .................. 349/96; 349/74; 349/142

[58] Field of Search .................. 349/165, 139, 349/142, 96, 74

[56] References Cited

U.S. PATENT DOCUMENTS

| | | | |
|---|---|---|---|
| 3,833,287 | 9/1974 | Taylor et al. | 349/179 |
| 3,857,628 | 12/1974 | Strong | 349/96 |
| 3,967,881 | 7/1976 | Moriyama et al. | 349/165 |
| 4,278,328 | 7/1981 | Mukoh et al. | 349/165 |
| 4,833,314 | 5/1989 | Pepper et al. | 359/370 |
| 5,175,637 | 12/1992 | Jones et al. | 349/86 |
| 5,295,018 | 3/1994 | Konuma et al. | 349/96 |
| 5,327,272 | 7/1994 | Fujiwara et al. | 349/139 |
| 5,352,379 | 10/1994 | Nishiyama et al. | 349/184 |
| 5,545,345 | 8/1996 | Sekine et al. | 349/184 |

*Primary Examiner*—William L. Sikes
*Assistant Examiner*—Tarifur R. Chowdhury
*Attorney, Agent, or Firm*—Colin M. Raufer; Leonard A. Alkov; Glenn H. Lenzen, Jr.

[57] ABSTRACT

A solid state aperture is formed with an optical system and an electrode system. In different embodiments, the optical system includes electrically-responsive attenuation members, e.g., black guest host liquid crystals, and electrically-responsive, polarization-rotation members, e.g., twisted nematic liquid crystals. The electrode system includes electrodes of electrically conductive, optically transparent materials which are applied to the optical system to define attenuation segments of a desired attenuation pattern.

3 Claims, 3 Drawing Sheets

5,893,622

OPTICAL APERTURE WITH PREDETERMINED ATTENUATION PATTERNS HAVING POLARIZERS THAT ARE BLACK GUEST HOST LIQUID CRYSTAL OR MULTILAYER, THINFILM, POLARIZING, BEAMSPLITTING PRISM

BACKGROUND OF THE INVENTION

1. Field of the Invention

The present invention relates generally to optical systems and more particularly to light-processing apertures in optical systems.

2. Description of the Related Art

Optical components, e.g., lenses and mirrors, typically have limited component apertures over which their optical processes are valid. In optical systems, these component apertures are often modified by the insertion of a discrete aperture which further limits the area of the optical process to improve a system performance parameter, e.g., reduce spherical aberration or select the depth of focus.

A discrete aperture's use in an optical system is often enhanced if the aperture's opening can be adjusted to accommodate changing conditions or system requirements. Accordingly, aperture structures have been developed in which the area of the aperture's opening is selectively adjusted by various methods, e.g., mechanical and electromechanical. Although the area of these apertures can be selected, there is typically no control over the attenuation of the aperture, i.e., the open area of the aperture is fully transmissive. Accordingly, the processing functions of conventional apertures is generally limited to restriction of an incident light beam. In addition, conventional adjustable apertures typically include moving parts which reduce their reliability and speed.

In contrast, electro-optical components are available which can process incident light with a plurality of attenuation values. For example, a polarizer and a black guest host liquid crystal can function as an electrically-responsive attenuator as can also a twisted nematic liquid crystal which is positioned between a pair of polarizers. Although these components can selectively attenuate a light beam, they lack the ability to provide spatially different attenuations over the cross section of a light beam.

SUMMARY OF THE INVENTION

The present invention is directed to optical apertures which substitute solid-state elements for moving parts and which can generate a range of selected attenuations in segments of predetermined attenuation patterns. Because these apertures can generate and modify attenuation patterns, their control of incident light is greatly enhanced over that of conventional apertures. For example, their processing can be specifically adapted to the characteristics (such as nonuniformity) of the incident light.

These goals are achieved with the recognition that a desired attenuation pattern can be realized by applying different electric potentials to portions of electrically-responsive light attenuators that correspond to segments of the desired attenuation pattern. It is further recognized that the attenuation of each attenuation segment can be independently adjusted with its corresponding electric potential.

Structurally, an optical aperture with a predetermined pattern of electrically-responsive attenuation segments is realized by combining an electrode system with a liquid crystal optical system which is arranged to have an aperture area and configured to have an optical attenuation over any portion of the aperture area that is a function of an electric potential applied to that portion. The electrode system is configured to receive a plurality of different selectable electric potentials and apply each selectable electric potential to the optical system over a different one of a plurality of aperture area segments.

In one aperture embodiment, the optical system includes a polarizer and an optical attenuation member in the form of a black guest host liquid crystal. The electrode system includes a reference electrode positioned on one face of the liquid crystal and a plurality of bias electrodes positioned on the other face. The electrodes are formed of an electrically-conductive, optically-transparent material.

In another aperture embodiment, the optical system includes an optical polarization-rotation member in the form of a twisted nematic liquid crystal that is positioned between input and output polarizers with the electrode system applied to the liquid crystal substrate.

The novel features of the invention are set forth with particularity in the appended claims. The invention will be best understood from the following description when read in conjunction with the accompanying drawings.

DETAILED DESCRIPTION OF THE PREFERRED EMBODIMENTS

Figures 1, 2:
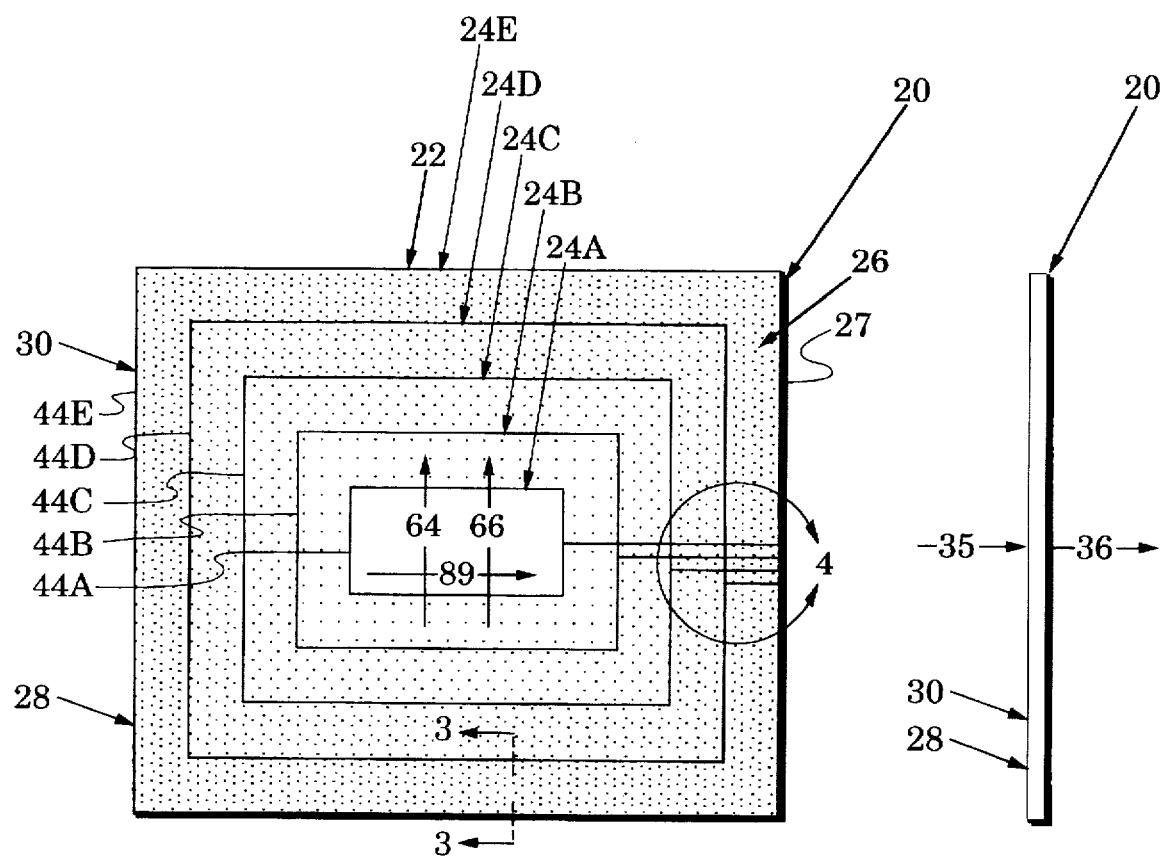
FIG. 1 is a front elevation view of an optical aperture embodiment in accordance with the present invention.
FIG. 2 is a side elevation view of the optical aperture of FIG. 1.

An optical aperture 20 which generates a predetermined pattern 22 of electrically-responsive attenuation segments 24A–24E is shown in FIGS. 1–4. The optical aperture 20 defines an aperture area 26 which is bounded by an aperture perimeter 27 (see FIG. 1). The optical aperture 20 includes an optical system 28 and an electrode system 30.

The optical system 28 is arranged to span the aperture area 26 and is configured to have an optical attenuation over any portion of the aperture area 26 that is a function of an electric potential which is applied to that portion. The electrode system 30 is configured to receive a different selectable electric potential for each of the attenuation segments 24A–24E and is arranged and positioned to apply each selectable electric potential to a portion of the aperture area 26 which corresponds with a different one of the attenuation segments 24A–24E.

Figures 3, 5:
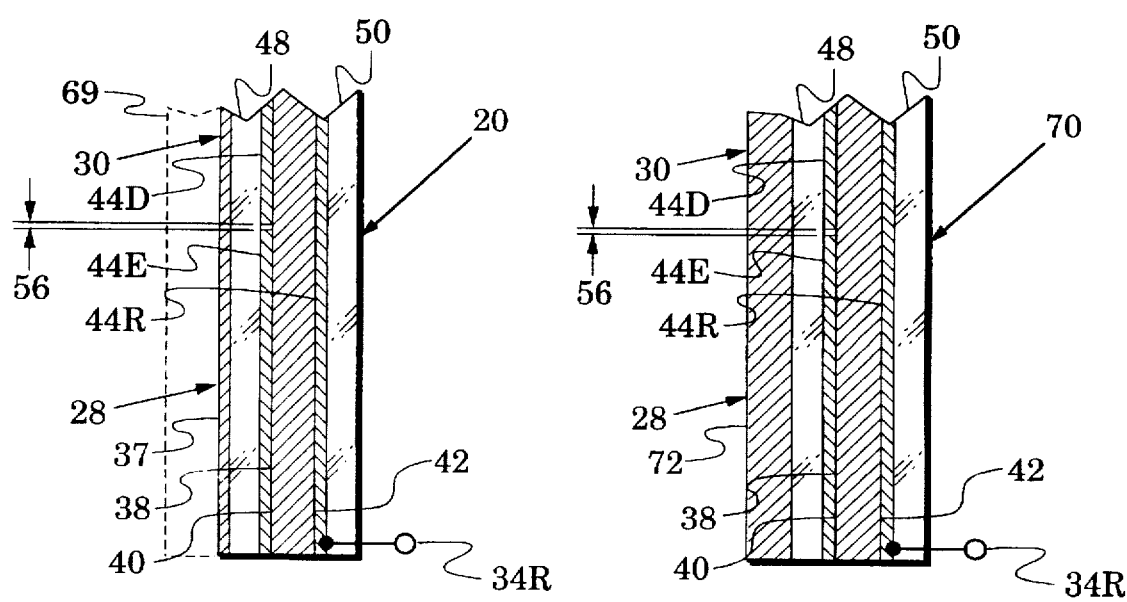
FIG. 3 is an enlarged view along the plane 3—3 of FIG. 1.
FIG. 5 is a view similar to FIG. 3 which illustrates another optical aperture embodiment.
Figure 4:
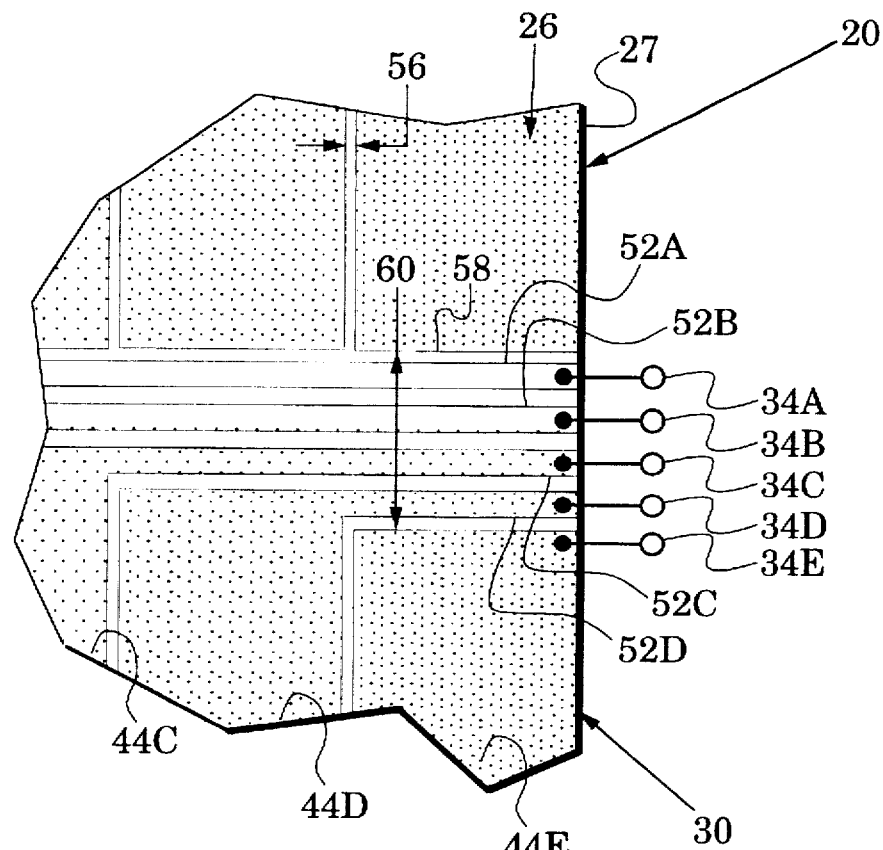
FIG. 4 is an enlarged view of the area within the curved line 4 of FIG. 1.

Electric potentials can be applied to the electrode system 30 through bias electrical terminals 34A–34E which are shown in FIG. 4 and a reference electrical terminal 34R which is shown in FIG. 3. In response to these potentials, the optical system 28 generates the predetermined pattern 22 of attenuation segments 24A–24E in which the attenuation in each segment is a function of the electric potential corresponding to that segment. For clarity of illustration, the attenuation segments 22A–22E are defined in FIGS. 1 and 5 with dot patterns whose densities indicate a selected set of relative attenuations through the attenuation segments (attenuation segment 24A having a zero-density dot pattern).

With selected attenuations in the attenuation segments 22A–22E, the optical aperture 20 can process an incident light beam 35 into a processed light beam 36 (see FIG. 2). Further operational descriptions of the optical aperture 20 are preceded by the following detailed description of the structure of the optical system 28 and electrode system 30.

The optical system 28 (see FIG. 3) has a polarizer 37 and an optical attenuation member in the form of a black guest host liquid crystal 38. The black guest host liquid crystal 38 has a entrance face 40 and an exit face 42. The polarizer 37 and the black guest host liquid crystal 38 span the aperture area 26 in FIG. 1.

The electrode system 30 (see FIGS. 1, 3 and 4) has bias electrodes 44A–44E and a reference electrode 44R which are films of an electrically-conductive, optically-transparent material, e.g., indium oxide, tin oxide or indium-tin oxide. Very thin metallic films, e.g., gold, may also be used. The bias electrodes 44A–44E are positioned to adjoin the entrance face 40 of the black guest host liquid crystal 38 and the reference electrode 44R is positioned to adjoin the exit face 42. The bias electrodes 44A–44E each cover a portion of the aperture area 26 in FIG. 1 which substantially corresponds respectively with the attenuation segments 22A–22E (for differentiation, the attenuation segments are indicated by arrows). The reference electrode 44R spans the aperture area 26.

The optical system 30 and the electrode system 32 are preferably supported across the aperture area (26 in FIG. 1) by transparent substrate members in the form of a pair of glass plates 48 and 50 (see FIG. 3). In the optical aperture embodiment 20, the polarizer 37 and the bias electrodes 44A–44E are positioned on opposite sides of the glass plate 48 and the reference electrode 44R is positioned between the black guest host liquid crystal 38 and the glass plate 50.

As shown in FIG. 4, each of the bias electrodes 44A–44E that does not adjoin the aperture perimeter 27 includes an electrode extension. The electrode extension of each such electrode is arranged to adjoin the perimeter 27 to facilitate application of an electric potential to that electrode without obscuring the aperture area 26. For example, FIG. 4 illustrates electrode extensions 52A–52D which extend respectively from bias electrodes 44A–44D to adjoin the aperture perimeter 27.

FIG. 4 also shows that the bias electrical terminals 34A–34E are connected at the perimeter 27 respectively to aperture extensions 52A–52D and to the bias electrode 44E. The reference electrical terminal 34R (see FIG. 3) is also preferably connected to the reference electrode 44R at the perimeter 27.

Although the bias electrodes 44A–44E must be separated by a space (e.g., the exemplary space 56 in FIGS. 3 and 4 between the electrodes 44D and 44E) so that they can support different electric potentials, photolithographic construction processes can reduce the space 56 to a very small value, e.g., ~2 microns.

Each bias electrode which separates a second bias electrode from the aperture perimeter 27 is preferably interrupted to form a slot which can pass an electrode extension from that second bias electrode to the perimeter 27 (see FIG. 4). For example, bias electrode 44E has a slot 58 with a width 60 to allow passage of the electrode extensions 52A–52D to the aperture perimeter 27. The width of this slot can be reduced by routing each of the electrode extensions 52A–52D to a different portion of the aperture perimeter 27. Although this latter arrangement reduces the width 60 of any individual slot, it requires a plurality of slots in the bias electrode 44A which adjoins the perimeter 27. This arrangement separates the bias electrode 44E into several electrode parts which would each require the attachment of a separate electrical contact.

The polarizer 37 has a transmission axis 64 which defines the polarization direction of the incident light after it is transmitted through the polarizer. The black guest host liquid crystal 38 has an attenuation axis 66 which is preferably aligned with the transmission axis 64 as shown in FIG. 1.

Black guest host liquid crystals include elongate molecules of black dye (the guest) which are formulated to absorb light and which are carried in association with elongate liquid crystal molecules (the host). The liquid crystal molecules rotate in response to an electric potential and carry the black dye molecules along in that rotation. As a result, the area of the black dye molecules which is presented along the attenuation axis 66 to an incident light is a function of the electric potential across the black guest host liquid crystal 38. Accordingly, the amount of light that is absorbed along the attenuation axis 66 is also a function of this potential.

In operation, an incident light beam 35 (see FIG. 2) is received by the polarizer 37 and selected electric potentials are established between the reference terminal 34R and each of the bias electrical terminals 34A–34E. This places the selected electric potentials across those portions of the black guest host liquid crystal 38 which are between the bias electrodes 44A–44E and the reference electrode 44R.

The incident light beam 35 is polarized by passage through the polarizer 37 to have its electric field vectors aligned with the transmission axis 64. As the polarized light passes through the black guest host liquid crystal 38, a portion of the light is absorbed by the black dye molecules of the liquid crystal 38. As stated above, that absorbed portion is a function of the electric potential across the liquid crystal 38. The attenuation through each portion of the aperture area 26 that is covered by a bias electrode is selectively determined by the electrical potential on that electrode. Accordingly the light power in each portion of the processed light beam 36 that corresponds with one of the bias electrodes 44A–44E is determined by a selected electric potential on that electrode.

Thus, the predetermined pattern of the bias electrodes 44A–44E determines the optical attenuation pattern 22 of the optical aperture 20 with the shape of each bias electrode determining the shape of one of the attenuation segments 24A–24E of that pattern. The electrical potentials applied to the bias electrical terminals 34A–34E (relative to the reference electrical terminal 34R) then selectively determine the attenuation through the corresponding pattern segments.

The polarizer 37 can be realized with a variety of conventional polarizers. An exemplary polarizer is formed of a absorption material (e.g., a polyvinyl alcohol sheet with impregnated iodine atoms) which selectively absorbs light along directions which are not aligned with the transmission axis (64 in FIG. 1) of the polarizer. Another exemplary polarizer is a polarizing beamsplitting prism which selectively refracts light with a pair of anisotropic crystals, e.g., a Glan-Thompson prism or a Nicol prism. Yet another exemplary polarizer is formed of immersed multilayer thin films, e.g., a beamsplitting prism such as a MacNeille prism. Polarizers realized with prism structures may require a larger volume, e.g., as indicated by broken lines 69 in FIG. 3.

The functions of the polarizer 37 can also be realized with another black guest host liquid crystal as shown in the optical aperture 70 of FIG. 5 which is a view similar to FIG. 3 with like elements indicated by like reference numbers. In the optical aperture 70, the polarizer 37 of FIG. 3 is specifically a black guest host liquid crystal 72 whose attenuation axis is aligned substantially orthogonal to the transmission axis 64 of FIG. 1. The black dye molecules of the liquid crystal 72 selectively absorb incident light which is not aligned with the polarization axis 64. Consequently, the incident light (35 in FIG. 2) is polarized along the polarization axis 64.

Figure 6:
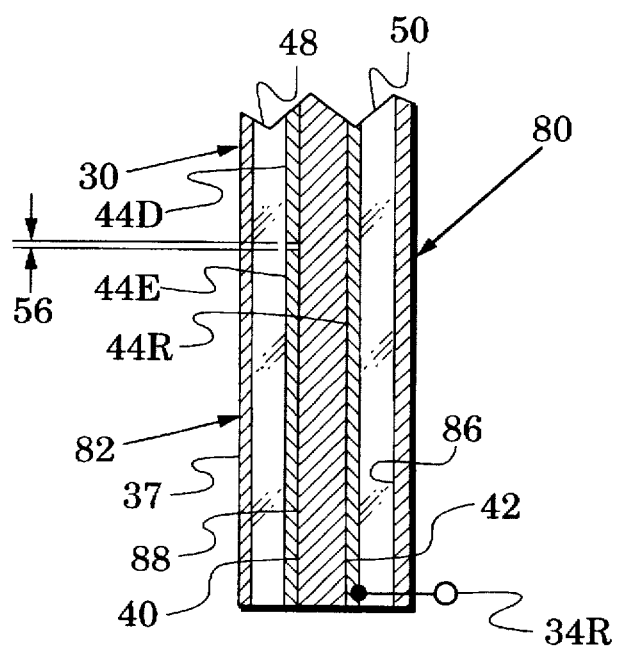
FIG. 6 is a view similar to FIG. 3 which illustrates another optical aperture embodiment.

Another optical aperture 80 is illustrated in FIG. 6 which is a view similar to FIG. 3 with like elements indicated by like reference numbers. The optical aperture 80 has an optical system 82 which includes an input polarizer 37 and an output polarizer 86 on either side of an electrically responsive, polarization-rotation member in the form of a twisted nematic liquid crystal 88 (the input polarizer 37 is the same polarizer 37 of FIG. 3).

Optical polarization-rotation materials rotate the polarization axis of polarized light which is processed through the material. A material having this function between a pair of polarizers forms an attenuator in which the attenuation is a function of the orientation of the polarizers and the polarization-rotation material.

In the optical aperture 80, the polarization axis 89 of the output polarizer 86 is oriented orthogonally with the polarization axis 64 of the input polarizer (the axis 89 is shown in FIG. 1) and the twisted nematic liquid crystal 88 has a 90° twist coefficient (i.e., it rotates incident light polarization by 90°) in the absence of an electric potential across the liquid crystal.

With a zero electric potential, the incident light is polarized by the input polarizer 36 and is transmitted through the output polarizer because the twisted nematic liquid crystal 88 rotates the polarized light so that it aligns with the transmission axis 89 of the output polarizer 86. Because the twist coefficient of the twisted nematic liquid crystal 88 is a function of the electric potential across the liquid crystal, the light attenuation of the optical system 82 is also a function of that electric potential.

The optical aperture 80 has the same electrode system 30 which was described above relative to the optical aperture 20. In operation, therefore, the optical aperture 80 forms the attenuation pattern 22 of FIG. 1 and the attenuation of the segments 24A-24E is determined by the electric potentials applied to the bias electrodes of the electrode system.

The optical system 82 of the optical aperture 80 can be realized with other conventional electrically responsive, polarization-rotation members. For example, ferroelectric liquid crystals also rotate polarization in response to an electric potential. In applications of the teachings of the present invention in which aperture speed is critical, a ferroelectric liquid crystal would be especially suitable because of its fast response time, e.g., <20 microseconds.

The electrically responsive, polarization-rotation member 88 and its input and output polarizers 37 and 86 can have any arrangement which causes attenuation through the combination to be a function of an electric potential across the member 88. Basically, the light from the member 88 is attenuated by the output polarizer 86 in accordance with Malus' law which states that if $I_o$ is a maximum incident intensity, then the transmitted intensity I for an angle θ between the polarization axis of the radiation from the member 88 and the transmission axis of the output polarizer 86 is given by $I=I_o \cos^2 \theta$. In another exemplary arrangement, the polarization axis 89 of the output polarizer 86 can be oriented in parallel with the polarization axis 64 of the input polarizer 37 and the twist coefficient of the member 88 increases from 0° to 90° as an electric potential is increased over the response range of the member 88.

The attenuation pattern 22 of the optical aperture 20 of FIG. 1 is shown to be a set of concentric rectangles. However, the selection of attenuation patterns is only limited by the shape of bias electrode films which can be applied to the attenuation member 38. Other exemplary attenuation patterns are shown in FIGS. 7A-7F.

Figure 7A:
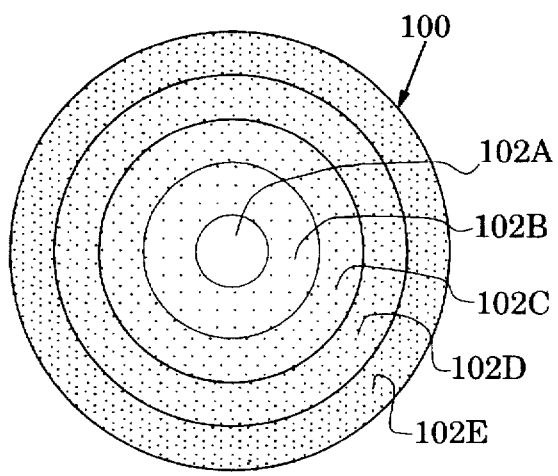
FIGS. 7A–7F illustrate other exemplary attenuation patterns which can be generated by optical aperture embodiments of the present invention.
Figure 7B:
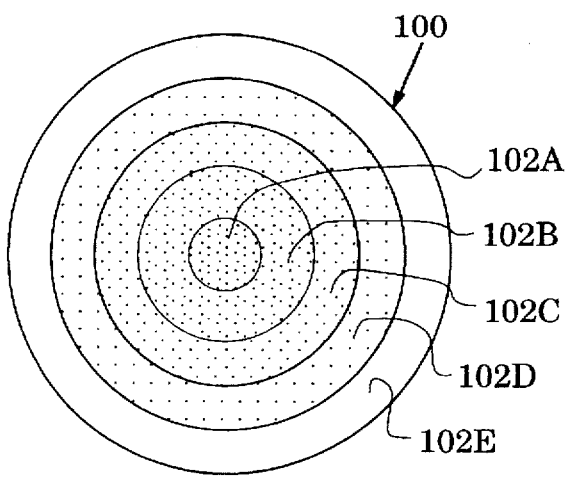
Figure 7C:
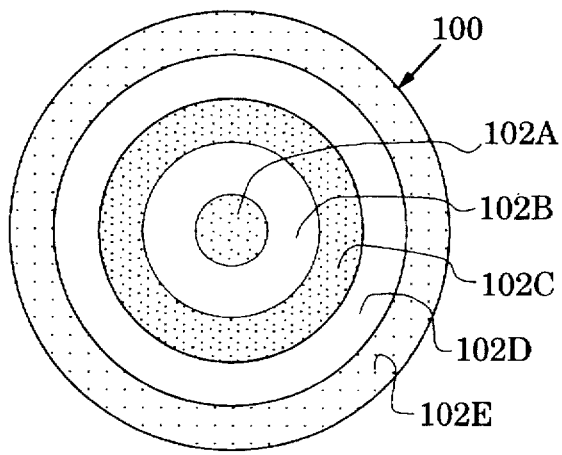

The predetermined pattern 100 of FIGS. 7A-7C is realized with bias electrodes which define concentric annular rings 102A-102E. By varying the electric potentials applied to the bias electrodes which define the pattern 100, the attenuation of each ring can be determined independently of the other rings. FIG. 7A shows an attenuation pattern in which the attenuation increases radially from the center of the pattern. FIG. 7B shows another attenuation pattern in which the attenuation decreases radially from the center of the pattern. FIG. 7C shows another attenuation pattern in which the attenuation varies randomly.

Figure 7D:
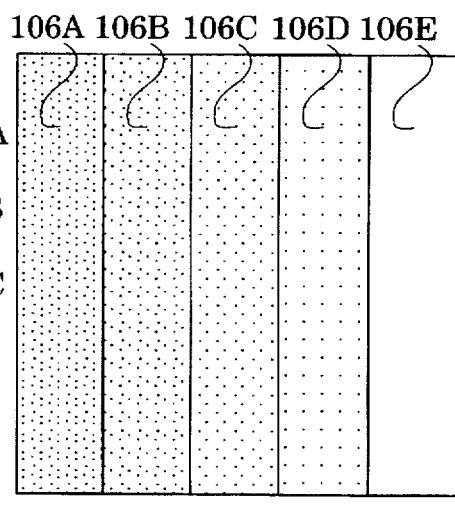
Figure 7E:
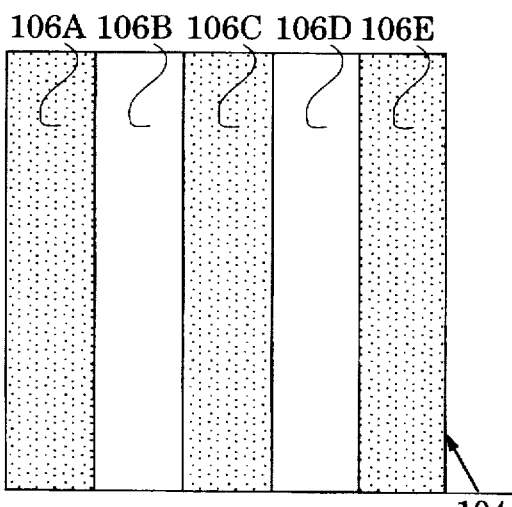
Figure 7F:
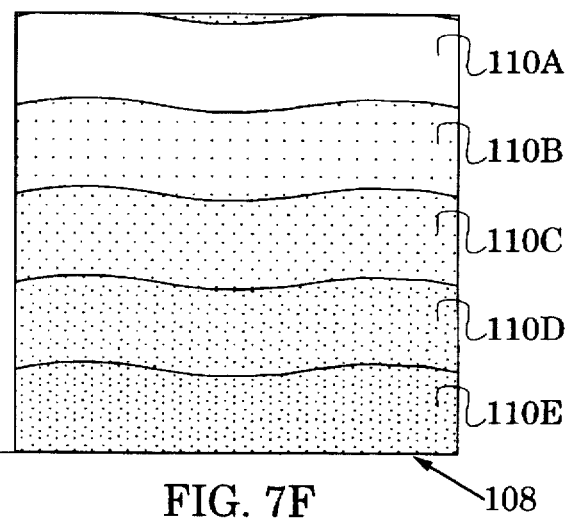

The pattern 104 of FIGS. 7D and 7E is realized with bias electrodes which define vertically-oriented strips 106A-106E. FIG. 7D shows an attenuation pattern in which the attenuation changes transversely from left to right while FIG. 7E shows a random on-off attenuation pattern. The pattern 108 of FIG. 7F is realized with bias electrodes which define horizontally-oriented wave-like strips 110A-110E.

The attenuation pattern of FIG. 7D might be used to process a light beam whose intensity decreases horizontally across the beam. The aperture patterns shown in FIGS. 1, and 7A-7F can completely attenuate an incident light beam by setting all attenuation segments to their maximum attenuation.

The support plates 48 and 50, the elements of the optical systems 28 and 82 and the elements of the electrode system 30 have been shown in FIGS. 3, 5 and 6 with thicknesses which were chosen for illustrative purposes. In an exemplary prototype design, the thicknesses of the substrate plates 48 and 50 would be in the range of 2-5 millimeters and the thicknesses of the other elements would be on the order of a few microns. In each realization of an aperture, the arrangement and position of the substrate plates can be chosen to enhance their support for the operative elements of the optical aperture. Although glass is a typical substrate, the substrates can be of any transparent supportive material, e.g. quartz.

For illustrative purposes, the attenuation patterns of FIGS. 1-7F have been limited to approximately five attenuation segments. However, photolithographic processes can be used in the deposition of the electrode system to reduce the width of each segment to a small value, e.g., ~4 to 6 microns, so that attenuation patterns taught by the invention can have a high degree of attenuation resolution.

The electrode system 30 of FIGS. 1-6 is arranged with one reference electrode 44R and a plurality of bias electrodes 44A-44E which substantially span the area of the reference electrode. Although this arrangement reduces the alignment requirements between electrodes on opposite sides of the attenuation member 38 and the member 88, the teachings of the invention can be practiced with any arrangement of electrodes that places selected electric potentials across the attenuation segments of a selected attenuation pattern.

For example, in FIG. 1 the reference electrode 44R on the exit face 42 of the optical attenuation member 38 could be replaced by an additional set of bias electrodes 44A–44E which are aligned with the existing set on the entrance face 40 of the member 38.

The optical aperture embodiments of FIGS. 1–6 have been directed to the processing of unpolarized light. They can be adapted for the processing of light which is already polarized by removing the input polarizer from each embodiment and replacing the other elements of the optical systems relative to the polarization axis rather than the transmission axis of the input polarizer. For example, an optical aperture for polarized light can be formed from the optical aperture 20 of FIGS. 1–4 by removing the polarizer 37 from the optical system 28.

The reliability of apertures of the invention is increased because they are formed with solid state elements. The speed and reliability of these apertures enhances their ability to perform traditional functions of conventional apertures, e.g., as an aperture stop which defines the maximum cone angle of light that is processed in an optical system. In addition, their ability to form complex attenuation patterns of selectable attenuation segments facilitates their use in functions that generally cannot be performed by conventional aperture structures, e.g., controlling the intensity nonuniformity of incident light.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. An optical aperture with a predetermined pattern of electrically-responsive attenuation segments, comprising:

an optical system arranged to have an aperture area and configured to have an optical attenuation over any portion of said aperture area that is a function of an electric potential applied to that portion, said optical system having:

a) a polarizer; and b) an optical attenuation member positioned adjacent to said polarizer and having spaced first and second faces which each span said aperture area, said optical attenuation member having a rotatable attenuation axis wherein the rotation over any portion of said aperture area is a function of an electric potential across said first and second faces in that portion of said aperture area; and an electrode system configured to receive a plurality of different selectable electric potentials and apply each selectable electric potential to said optical system over a different one of a plurality of aperture area segments, said electrode system having:

a) a reference transparent electrode positioned adjacent one of said first and second faces; and b) a plurality of bias transparent electrodes positioned adjacent the other of said first and second faces wherein each of said bias transparent electrodes is arranged to cover a portion of said aperture area which corresponds with a different one of said segments;

wherein said optical attenuation member has a perimeter and each of said bias transparent electrodes that does not adjoin said perimeter includes an electrode extension which is arranged to adjoin said perimeter to facilitate application of an electric potential to that bias transparent electrode.

2. An optical aperture with a predetermined pattern of electrically-responsive attenuation segments, comprising:

an optical system arranged to have an aperture area and confirmed to have an optical attenuation over any portion of said aperture area that is a function of an electric potential applied to that portion, said optical system having:

a) first and second polarizers; and b) an optical polarization-rotation member positioned between said first and second polarizers and having spaced first and second faces which each span said aperture area, said optical polarization-rotation member having a polarization rotation over any portion of said aperture area which is a function of an electric potential across said first and second faces in that portion of said aperture areas; and an electrode system configured to receive a plurality of different selectable electric potentials and apply each selectable electric potential to said optical system over a different one of a plurality of aperture area segments;

wherein said first and second polarizers are each a multilayer, thin-film, polarizing beamsplitting prism.

3. An optical aperture with a predetermined pattern of electrically-responsive attenuation segments, comprising:

an optical system arranged to have an aperture area and configured to have an optical attenuation over any portion of said aperture area that is a function of an electric potential applied to that portion, said optical system having:

a) first and second polarizers; and b) an optical polarization-rotation member positioned between said first and second polarizers and having spaced first and second faces which each span said aperture area, said optical polarization-rotation member having a polarization rotation over any portion of said aperture area which is a function of an electric potential across said first and second faces in that portion of said aperture areas; and an electrode system configured to receive a plurality of different selectable electric potentials and apply each selectable electric potential to said optical system over a different one of a plurality of aperture area segments;

wherein said first and second polarizers are each a black guest host liquid crystal.

* * * * *